United States Patent Office 3,278,526
Patented Oct. 11, 1966

3,278,526
PROCESS FOR PREPARING MERCAPTO- AND THIOETHER-SUBSTITUTED HETEROCYCLIC NITROGEN-CONTAINING COMPOUNDS
Rector P. Louthan and Raymond L. Cobb, Bartlesville, Okla., assignors to Phillips Petroleum Company, a corporation of Delaware
No Drawing. Filed Mar. 8, 1962, Ser. No. 178,265
12 Claims. (Cl. 260—239.3)

This invention relates to the preparation of organic compounds. More particularly, it relates to the preparation of novel N-mercaptoalkyl amides and/or N-(substituted mercaptoalkyl) amides by a free radical catalyzed reaction using certain N-alkenyl amides.

We have discovered that novel and useful N-mercaptoalkyl amides and/or N-(substituted mercaptoalkyl) amides can be prepared by the novel free radical catalyzed reaction of hydrogen sulfide or a primary mercaptan with certain N-alkenyl amides. This new class of N-alkenyl amide reactants are selected from the group consisting of:

$$R_1-C=O$$
$$R_4-N-R_2 \quad (I)$$

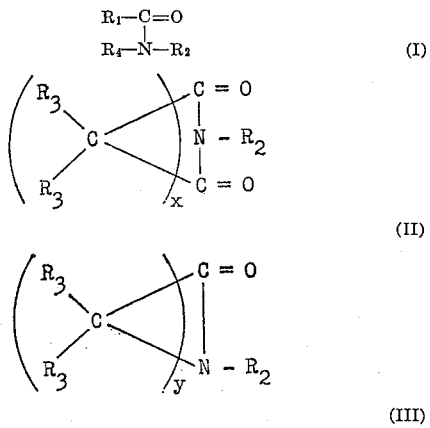

(II)

(III)

In the above structural formulas, $R_1$ and $R_3$ are selected from the group consisting of a hydrogen atom, alkyl and cycloalkyl radicals, and combinations of said radicals such as alkylcycloalkyl, cycloalkylalkyl, alkylcycloalkylalky, polycycloakyl, and alkylpolycycloalkyl, $R_2$ is an alkenyl radical, and $R_4$ is selected from the group consisting of $R_1$ and the radical

When $R_4$ is a hydrogen atom, the alpha-carbon atom in the alkenyl chain is bonded to other atoms by single bonds only. $R_1$ can have 1 to 20, preferably 1 to 6, carbon atoms, $R_2$ can have 2 to 20, preferably 2 to 6, carbon atoms, and $R_3$ can have 1 to 10, preferably 1 to 6, carbon atoms, and the total number of carbon atoms in each of these compounds is preferably not greater than 20, though it can be as great as 50. The $R_1$ and $R_3$ radicals are substituents which are inert in the reaction of the N-alkenyl amides with hydrogen sulfide or primary mercaptans, according to this invention. The term polycycloalkyl covers monovalent radicals from saturated bicyclo or tricyclo bridged hydrocarbon ring systems. The alkenyl radical $R_2$ is preferably a straight-chain radical with a terminal double bond. Where $R_1$ and $R_3$ comprise one or more cycloalkyl radicals, such radicals preferably have 5 or 6 ring carbon atoms. Subscript $x$ is an integer from 0 to 20, preferably 1 to 6, and subscript $y$ is an integer from 3 to 20, preferably 3 to 6.

Compounds of type shown by structural Formula II above are sometimes named as imides, and those shown by structural Formula III above as lactams. Since both types of compounds are in effect intramolecular or inner amides, and thus similar to the true amides of Formula I, I prefer to generically refer to the compounds of Formulas I, II, and III as N-alkenyl amides, and such generic language will be employed in this specification and in the appended claims when speaking of all three types of compounds. Such compounds are known in the art, as are their preparation.

Representative N-alkenyl amide reactants coming within the scope of the above structural formulas and useful in the practice of this invention representatively include:

N-vinyl-N-methyl-formamide
N-allylformamide
N-ethyl-N-vinyl formamide
N-allylacetamide
N-(2-butenyl)propionamide
N-(5-hexenyl)-N-ethylpropionamide
N-(2-methylallyl)-N-n-pentylcyclohexanecarboxamide
N-allyl-N-(3-methyl-n-butyl)-2-(3methylcyclohexyl) cyclopropanecarboxamide
N-eicosyl-N-vinyleicosanecarboxamide
N-decyl-N-5-decenylcyclohexanecarboxamide
N-vinyl-N-methyl-cyclohexylacetamide
N-allyl-2-methylcyclohexanecarboxamide
N-(5-hexenyl)-3-(alpha-pinyl)caproamide
N-vinyl-N-methyl-2-(3-methylcyclopentyl)butyramide
N-vinyl-N-cyclopropyl-cyclopropanecarboxamide
N-(8-nonenyl)-N-cyclohexyldecalincarboxamide
N-decyl-N-9-decenyl-3-undecylpelargonamide
N-(19-eicosenyl)-N-(4-n-butylcyclooctyl)3-n-propyltetradecanecarboxamide
N-vinyl-N-pinyl-cycloeicosanecarboxamide
N-allyl-N-3-cyclohexylpropylacetamide
N-2-butenyl-N-cyclopropylformamide
N-vinyl-N-cycloeicosyl-4-cyclododecylvaleramide
N-vinyl diformamide
N-allyl diacetamide
N-2-butenyl dibutyramide
N-vinyl-N-acetylheneicosanamide
N-3-octenyl diheneicosanamide
N-19-eicosenyl-N-propionyl decanoamide
N-vinyl di(cyclohexanecarboxamide)
N-3-pentenyl-N-acetylcyclohexanecarboxamide
N-vinyl-N-propionylcyclopropanecarboxamide
N-4-decenyl-N-formylcycloeicosanecarboxamide
N-allyl di(cyclohexaneacetamide)
N-vinyl-N-acetylcyclopropaneacetamide
N-allyl-N-propionylmethylcyclopropanecarboxamide
N-vinyl-N-formyl-(14-cyclohexyl)-tetradecanecarboxamide
N-allyl-N-acetyl-4-tetradecylcyclohexanecarboxamide
N-vinyl di(4-[3-butylcyclohexyl])decanecarboxamide
N-allyl di(1-pinanecarboxamide)
N-allylsuccinimide
N-vinyloximide
N-2-butenylglutarimide
N-allyl-3-methyladipimide
N-5-hexyl-2,3-di-n-butylsuberimide
N-19-eicosenyl-4-cyclohexylsebacimide
N-vinylmalonimide
N-allyl-2,2-dimethylmalonimide
N-4-pentenyl-3-dicyclohexylpimelimide
N-allyl-2-methylcyclopentyl-1,22-docosanedicarboximide
N-vinyl-2-([3-ethylcyclohexyl]methyl)azelaimide
N-15-hexadecenyl-4-tetradecyl-1,20-eicosanedicarboximide
N-4-octenyl-2-cyclopropylmalonimide
N-vinyl-2-cycloeicosylsuccinimide
N-allyl-3-(2-cyclohexylethyl)glutarimide
N-9-decenyl-2-cyclododecylsuccinimide
N-vinyl-2-eicosyladipimide N-allyl-2,2,3,3,4,4-hexamethylglutarimide
N-3-butenyl-3-(14-cyclohexyltetradecyl)suberimide
N-3-pentenyl-4-(2-tetradecylcyclohexyl)sebacimide
N-allyl-2-methylcyclopropylmalonimide
N-vinyl-2-cyclopropylmethylpimelimide
N-allyl-3-(1-bicyclo[2.2.0]hexyl)adipimide
N-(2-methylenepentyl)-3-(4-methylcyclohexyl)-4-ethyl-5-cyclohexyladipimide
N-vinyl-2-pyrrolidone
N-allyl-2-piperidone
N-vinylcaprolactam
N-2-butenyl-12-aminolauric acid lactam
N-(7-decenyl)-14-amino-5-cyclohexylmyristic acid lactam
N-vinyl-4-methylcyclohexylcaprolactam
N-allyl-3-cyclohexylmethyl-2-pyrrolidone
N-allyl-3-dicyclohexyl-2-piperidone
N-(19-eicosenyl)-19-amino-5-decyleicosanoic acid lactam
N-vinyl-4-cyclopropyl-21-aminoheneicosane acid lactam
N-2-butenyl-3-cycloeicosylcarprolactam
N-allyl-3-(2-tetradecylcyclohexyl)piperidone
N-vinyl-3-(12-cyclohexyltetradecyl)pyrrolidone
N-3-pentenyl-4-(methylcyclopropyl)caprolactam
N-vinyl-3-(cyclopropylmethyl)piperidone
N-allyl-3-eicosylcaprolactam
N-vinyl-3-(2-[4-methylcyclohexyl]ethyl)pyrrolidone
N-2-butenyl-3-methylcyclopropylmethylpiperidone
N-allyl-3-(12[4-ethylcyclohexyl]dodecyl)caprolactam
N-(2-methylenepentyl)-3-(3-methylcyclohexyl)-4-methyl-5-cyclohexyl-2-piperidone
and the like.

The aforementioned N-alkenyl amides are reacted according to this invention with hydrogen sulfide or a primary mercaptan. Generally, these latter reactants can be expressed by the general formula $R_5SH$, where $R_5$ is selected from the group consisting of hydrogen, and alkyl or aralkyl radicals each having 1 to 12 carbon atoms. In addition to hydrogen sulfide, the preferred reactant, other reactants of this type include such primary mercaptans as methyl mercaptan, ethyl mercaptan, n-propyl mercaptan, n-butyl mercaptan, 2-methylpropyl mercaptan, 3-ethyldecyl mercaptan, n-dodecyl mercaptan, phenylmethylmercaptan, 6-phenylhexyl mercaptan, 3-phenylbutyl mercaptan, and the like. The amount of $R_5SH$ used in the above-described reaction will vary, and generally be in the range between 0.1 to 10 moles, preferably 0.4 to 4 moles, per mole of the N-alkenyl amide.

Any of the free radical catalytic agents heretofore used in catalyzing the reaction of hydrogen sulfide and hydrocarbons having an olefinic linkage can be used in the practice of this invention. For example, peroxide compounds, organic azo compounds, and actinic radiation, such as ultraviolet radiation, can be employed as free radical catalytic agents. Representative peroxide compounds which can be used for this purpose include di-tertiaryalkyl peroxides such as di-tertiarybutyl peroxide and other peroxides such as alkylhydroperoxides, alkyl peroxy esters, diacyl peroxides, and the like. Suitable azo catalysts which can be used representatively include those having an acyclic azo group, —N=N—, bonded to different non-aromatics, i.e., aliphatic or cycloaliphatic carbons, at least one of which is tertiary, e.g., alpha, alpha'-azodiisobutyronitrile, alpha, alpha'-azobis (alpha, gamma-dimethylvaleronitrile), and the like, such as those disclosed in U.S. Patents 2,471,959, 2,492,763 and 2,503,253.

The actinic radiation which can be used as a free radical catalyst in carrying out the method of this invention will generally have a potential or energy level in the range of 3.1 to $1 \times 10^8$ electron volts. The radiation dose rate will generally be from $10^3$ to $10^7$ roentgens equivalent physical per hour (rep./hr.), and the total radiation dosage will generally be from $10^5$ to $10^{11}$ reps., preferably $10^7$ to $10^9$ reps. Lower radiation rates can be used but are not practical from a time standpoint since the rate of reaction will be correspondingly slow, and higher rates, although usable, are difficult to attain and are not necessary in the practice of this invention. The radiation dosages and rates, as used herein, are internal or actual dosages and rates received by the reaction system. The unit of roentgen equivalent physical corresponds to an absorption of 93 ergs./gram of material, the material being water, hydrocarbon or rubber which have very nearly the same absorption co-efficients. The unit of roentgen equivalent physical is also equal to $5.80 \times 10^{13}$ electron volts.

Actinic radiation useful in the practice of this invention include activating rays such as ultraviolet rays having a wavelength in the range of 100 to 3800 Angstroms, and ionizing rays such as alpha rays, beta rays, gamma rays, X-rays, deuterons, protons, and neutrons. The ultraviolet rays can be supplied from lamps or other apparatus which are available for generation of such rays. Sources of radiation include electrical devices such as cathode tubes, which produce electrons, and various accelerators, such as cyclotrons, synchrotrons, betatrons, which produce electrons, protons, deuterons and alpha particles. The natural and artificial radioactive elements can also be used as sources of radiation. The radioactive isotopes of radium, thorium, bismuth, palladium, cobalt, phosphorus, strontium, and the like can be used as a source of rays. Spent fuel elements can also be used as radiation sources, particularly since they are a low cost source of ionizing radiation. Still another source of ionizing radiation are the highly energetic fragments which result at the moment of fission.

Reaction promoters can be used in the method of this invention in addition to free radical catalysts. In particular, organic tri-alkyl phosphites having the general formula $(RO)_3P$, where R is an alkyl radical having 1 to 10 carbon atoms, and preferably where each R is the same normal alkyl radical having 1 to 5 carbon atoms, can be used as promoters, particularly in conjunction with ultraviolet radiation. The amount of promoter used can vary and stated functionally will be that amount sufficient to promote the reaction and increase the conversion; for most applications, the amount of reaction promoter will be in the range of 0.001 and 100 moles per mole of the N-alkenyl amides.

Representative phosphite reaction promoters useful in the practice of this invention include trimethyl phosphite, triethyl phosphite, tripropyl phosphite, tributyl phosphte, tripentyl phosphite, dimethyl ethyl phosphite, diethyl methyl phosphite, methyl ethyl propyl phosphite, dimethyl propyl phosphite, diethyl butyl phosphite, dibutyl propyl phosphite, trihexyl phosphite, triheptyl phosphite, trioctyl phosphite, trinonyl phosphite, tridecyl phosphite, dihexyl octyl phosphite, hexyl heptyl octyl phosphite, dihexyl nonyl phosphite, dimethyl decyl phosphite, didecyl pentyl phosphite, triisopropyl phosphite, triisopentyl phosphite, triisobutyl phosphite, dimethyl isobutyl phosphite, diethyl isooctyl phosphite, and the like.

The free radical catalyzed reaction of this invention can also be carried out in the presence of solvents or diluents, such as water and low molecular weight alcohols such as methanol, ethanol, isopropanol, n-pentanol and the like. Where the N-alkenyl amide used has a fairly high molecular weight, the solvents used should also preferably have a fairly high molecular weight. In some cases the above-described $R_5SH$ mercaptan compounds can also serve as the solvent or diluent in the reaction.

The reaction of this invention can be carried out in a manner like that of the prior art, and may be effected in a batch, intermittent, or continuous manner. The reaction temperature can vary over a wide range, and generally will be within —50 to 300° F., preferably from 50 to 150° F., although the upper limit is dictated by pressure, since some of the lower molecular weight reactants will have an extremely high vapor pressure which will entail the use of high pressure vessels if the reaction is carried out at temperatures outside of this range. The pressure at which the reaction is carried out will also vary. Generally speaking, the reaction times will also vary and can be carried out, for example, within the range between 0.5 and 20 hours, preferably 1 to 5 hours.

After reaction is completed, the products of reaction can be recovered by well-known means. For example, gases can be recovered and recycled, if desired, and the liquid product fractionated, distilled, crystallized, or subjected to various other separation and recovery procedures to obtain the desired products.

As mentioned earlier, the products obtained by the practice of this invention are N-mercaptoalkyl amides and/or N-(substituted mercaptoalkyl) amides. The particular products formed will be dependent upon whether the reaction is carried out with hydrogen sulfide or a primary mercaptan, whether the double bond in the alkenyl radical of the N-alkyl amide reactant is an internal or terminal double bond, and whether a single N-alkenyl amide reactant is used or a mixture of such N-alkenyl amides. Where hydrogen sulfide is used in the free radical catalyzed reaction of this invention, the products thus formed will be mercaptans and/or thioethers (sulfides) resulting from the further reaction of mercaptan products with the N-alkenyl amide reactant. If the double bond of the alkenyl radical in the N-alkenyl amide reactant is a terminal double bond, the products comprise primary mercaptans and/or primary thio-ethers, since the reaction will proceed in an "abnormal" or "anti-Markownikoff" manner, such that the $R_5S-$ group of the said $R_5SH$ reactant becomes affixed to the unsaturated carbon atom holding the most hydrogen bonds (i.e., the terminal carbon atom) and the hydrogen atom of the $R_5SH$ reactant becomes affixed to the unsaturated carbon atom carrying the lesser number of hydrogen atoms. If the double bond of the alkenyl radical in the N-alkenyl amide reactant is an internal double bond, in which case the unsaturated carbon atoms may contain the same number of hydrogen atoms, the addition of the hydrogen atom and sulfhydryl group of the $R_5SH$ reactant will take place in a statistically random manner, forming secondary mercaptan and/or thio-ether products, the latter being unsymmetrical.

Where the $R_5SH$ reactant is a primary mercaptan, i.e. where $R_5$ is an alkyl or aralkyl radical, the resulting products formed are unsymmetrical thio-ethers. If the double bond of the alkenyl radical in the N-alkenyl amide is a terminal double bond, then the resulting products will be unsymmetrical thio-ethers, anti-Markownikoff products. If the double bond of the alkenyl radical in the N-alkenyl amide is an internal double bond, then the resulting products will be secondary thio-ethers.

It is also within the scope of this invention, in that aspect wherein the $R_5SH$ reactant is hydrogen sulfide, to isolate the mercaptan product and then to react it with further N-alkenyl amide to form symmetrical or unsymmetrical thio-ethers.

The products formed according to this invention can be represented by the following structural formula:

$$R_6-S-R_7 \quad (IV)$$

where $R_6$ is selected from the group consisting of said $R_5$ radical (in the thiolation agent $R_5SH$, where $R_5$ is selected from the group consisting of a hydrogen atom and alkyl and arakyl radicals), and a radical selected from the group consisting

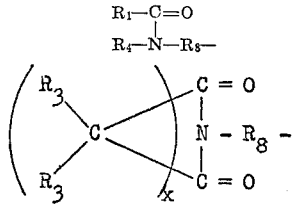

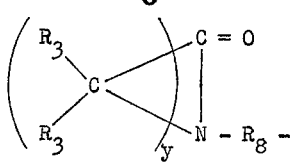

where $R_8$ is an alkylene radical having 2 to 20 carbon atoms, and where $R_7$ is selected from the group consisting of the said radicals V, VI, and VII.

In view of the above discussion of the types of products which can be formed, and in view of the extensive listing of N-alkenyl amides given above, the particular products formed from any particular N-alkenyl amide and $R_5SH$ will be evident to those skilled in the art, and in the interest of brevity no extensive listing of such products is necessary. For example, if hydrogen sulfide is reacted with N-vinyl pyrrolidone, according to this invention, the products obtained will be N-2-mercaptoethyl pyrrolidone and/or bis(2-[2-pyrrolidone-1-yl]ethyl)sulfide. Similarly, if the $R_5SH$ reactant used is methyl mercaptan and it is reacted with N-allyl succinimide, the resulting product formed will be N-(3-methyl-mercaptopropyl) succinimide.

The N-mercaptoalkyl amides and N-(substituted mercaptoalkyl) amides of this invention are useful for a number of purposes, such as pesticides, dyestuff intermediates, pharmaceuticals (such as anti-radiation drugs), inhibitors for enzymatic deterioration of plants, and rubber polymerization chemicals, such as polymerization modifiers.

The following examples serve to illustrate the objects and advantages of this invention, but the various reactants, conditions of reaction, and other details recited in these examples should not be construed so as to limit unduly this invention.

EXAMPLE I

A run was carried out in which N-vinyl-2-pyrrolidone was reacted with $H_2S$ in the presence of ultraviolet light. In this run, a mixture of 180 grams (1.62 moles) of N-vinyl-2-pyrrolidone, 112 grams (3.3 moles) of hydrogen sulfide, and approximately 5 ccs. of trimethyl phosphite was irradiated with a 100 watt high pressure mercury vapor lamp for 90 minutes at 25.5 to 28° C. and 100 to 142 p.s.i.g. After weathering off the unreacted hydrogen sulfide, the reaction solution was distilled, and 156 grams of N-2-mercaptoethyl-2-pyrrolidone was obtained. This represents a yield of 66.3 percent. The product boiled at 99° C. 0.3 mm. Hg absolute pressure, had a refractive index $n_D^{20}=1.5278$, and the following elemental analysis.

*Elemental analysis*

|  | Calculated (for $C_6H_{11}NOS$) | Found |
| --- | --- | --- |
| Carbon, percent | 49.62 | 49.3 |
| Hydrogen, percent | 7.63 | 7.8 |
| Nitrogen, percent | 9.65 | 9.35 |
| Sulfur, percent | 22.08 | [1] 21.6 |

[1] By—SH titration.

Further distillation of the residue gave 26% of bis(2-[2-pyrrolidon-1-yl]ethyl)sulfide with a boiling point at 1 mm. of 200–230° C. and melting point of 59–60° (from ethyl acetate). Elemental analysis is shown below for this product:

*Elemental analysis*

|  | Calculated (for $C_{12}H_{20}N_2O_2S$) | Found |
| --- | --- | --- |
| Carbon, percent | 56.25 | 56.4 |
| Hydrogen, percent | 7.81 | 7.8 |
| Nitrogen, percent | 10.93 | 10.8 |
| Sulfur, percent | 12.51 | 12.13 |

EXAMPLE II

In another run, N-vinylcaprolactam was reacted with hydrogen sulfide in the presence of ultraviolet light.

In this run, a mixture of 210 grams (1.5 moles) of N-vinylcaprolactam, 154 grams (4.5 moles) of hydrogen sulfide and approximately 4 ccs. of trimethyl phosphite were irradiated with a 100 watt mercury vapor lamp for 90 minutes at 24 to 26° C. and 152 to 168 p.s.i.g. After weathering off the unreacted hydrogen sulfide, the reaction solution was distilled in a short path distillation column to obtain 157 grams overhead, boiling point 80 to 160° C. at 1.0 mm. Hg absolute pressure (some decomposition) and 75.4 grams of kettle bottoms. The overhead was carefully redistilled in a 24″ Vigreaux column to obtain N-2-mercaptoethyl caprolactam. The yield was 74 grams of this compound, or 28.5 percent. The product boiled at 128 to 129° C. at 0.7 mm. Hg absolute pressure, had a refractive index $n_D^{20}=1.5315$, and the following elemental analysis:

*Elemental analysis*

|  | Calculated (for $C_8H_{15}NOS$) | Found |
|---|---|---|
| Carbon, percent | 55.45 | 55.7 |
| Hydrogen, percent | 8.73 | 8.9 |
| Nitrogen, percent | 8.08 | 7.9 |
| Sulfur, percent | 18.51 | [1] 17.0 |

[1] By—SH titration.

EXAMPLE III

A run was carried out in which N-allylformamide and $H_2S$ were reacted in the presence of ultraviolet light.

In this run, a mixture of 163 grams of N-allylformamide, 136 grams of hydrogen sulfide and approximately 4 ccs. of trimethyl phosphite was irradiated with a 450 watt high pressure mercury vapor lamp for 2 hours at 14 to 23° C. After weathering off the excess hydrogen sulfide, the desired product was isolated by three distillations on a short path column. Excessive decomposition prevented distillation on a more efficient column. The first distillation gave 139 grams overhead (product plus unreacted allylformamide) and 68.5 grams of high boiling material. Redistillation of the overhead gave 75 grams (34 percent yield) of crude N-3-mercaptopropyl formamide, boiling at 120 to 134° C. at less than 3 mm. Hg absolute pressure. Redistillation gave 22.5 grams of a center cut of N-3-mercaptopropyl formamide, boiling at 100 to 103° C. and having a refractive index $n_D^{20}=1.5190$. The latter product had the following elemental analysis.

*Elemental analysis*

|  | Calculated (for $C_4H_9NOS$) | Found |
|---|---|---|
| Carbon, percent | 40.31 | 40.48 |
| Hydrogen, percent | 7.61 | 8.17 |
| Nitrogen, percent | 11.75 | 11.45 |
| Sulfur, percent | 26.90 | [1] 26.85 |

[1] By—SH titration.

EXAMPLE IV

In another run, N-allyl succinimide and $H_2S$ were reacted in the presence of ultraviolet light.

In this run, a mixture of 86 grams of N-allyl succinimide, 42 grams of hydrogen sulfide and approximately 2 ccs. of trimethyl phosphite was irradiated with a 100 watt mercury vapor lamp for one hour at 14 to 22° C. and 115 to 133 p.s.i.g. After venting unreacted hydrogen sulfide, the product was distilled on a 25″ Vigreaux column, and 66 grams of N-3-mercaptopropyl succinimide was obtained. This product boiled at 137° C. at 0.35 mm. Hg absolute pressure, and had a refractive index $n_D^{20}=$ 1.5330. This represents a yield of 62 mole percent. The nuclear magnetic resonance spectra of this compound was consistent with the 3-mercaptopropyl structure; elemental analysis gave the following results:

*Elemental analysis*

|  | Calculated (for $C_7H_{11}NO_2S$) | Found |
|---|---|---|
| Carbon, percent | 48.53 | 48.61 |
| Hydrogen, percent | 6.40 | 6.45 |
| Nitrogen, percent | 8.09 | 8.2 |
| Sulfur, percent | 18.51 | [1] 18.1 |

[1] By—SH titration.

Various modifications and alternations of this invention will become apparent to those skilled in the art wtihout departing from the scope and spirit of this invention, and it should be understood that this invention is not to be limited unduly to that set forth herein for illustrative purposes.

We claim:

1. A process for preparing organic compounds, which comprises reacting an N-alkenyl amide selected from the group consisting of

 (I)

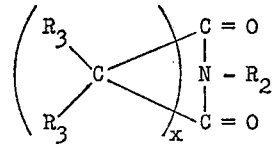 (II)

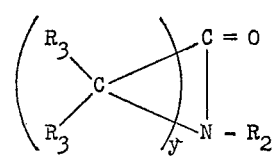 (III)

where $R_1$ and $R_3$ are selected from the group consisting of a hydrogen atom, alkyl and cycloalkyl radicals, and combinations of such radicals, $R_2$ is an alkenyl radical, $R_4$ is selected from the group consisting of $R_1$ and

$x$ is an integer from 0 to 20, $y$ is an integer from 3 to 20, and when $R_4$ is a hydrogen atom the alpha-carbon atom in said alkenyl radical is bonded to other atoms by single bonds only, with a compound of the formula $R_5SH$ where $R_5$ is selected from the group consisting of a hydrogen atom and alkyl aralkyl radicals having 1 to 12 carbon atoms, in the presence of a free radical catalyst, and recovering the resulting compounds formed by said reaction, wherein $R_1$ can have 1 to 20 carbon atoms, $R_2$ can have 2 to 20 carbon atoms, $R_3$ can have 1 to 10 carbon atoms, and the maximum number of carbon atoms per molecule in said N-alkenyl amide is 50.

2. The process according to claim 1 wherein $R_1$ has 1 to 6 carbon atoms, $R_2$ has 2 to 6 carbon atoms, $R_3$ has 1 to 6 carbon atoms, the maximum number of carbon atoms per molecule in said N-alkenyl amide is 20, $x$ is an integer from 1 to 6, and $y$ is an integer from 3 to 6, and wherein $R_5$ is a hydrogen atom.

3. The process according to claim 1 wherein said free radical catalyst is selected from the group consisting of oza compounds, peroxide compounds, and actinic radiation.

4. The process according to claim 1 wherein said free radical catalyst is ultraviolet radiation.

5. The process according to claim 1 wherein said free radical catalyst is an azo compound.

6. The process according to claim 1 wherein said N-alkenyl amide is that shown by said Formula I.

7. The process according to claim 1 wherein said N-alkenyl amide is that shown by said Formula II.

8. The process according to claim 3 wherein said N-alkenyl amide is that shown by said Formula III.

9. The process which comprises reacting N-vinyl-2-pyrrolidone with hydrogen sulfide in the presence of ultraviolet radiation and recovering N-2-mercaptoethyl-2-pyrrolidone from the resulting reaction mixture.

10. The process which comprises reacting N-vinylcaprolactam with hydrogen sulfide in the presence of ultraviolet radiation and recovering N-2-mercaptoethylcaprolactam from the resulting reaction mixture.

11. The process which comprises reacting N-allylformamide with hydrogen sulfide in the presence of ultraviolet radiation and recovering N-3-mercaptopropylformamide from the resulting reaction mixture.

12. The process which comprises reacting N-allyl succinimide with hydrogen sulfide in the presence of ultraviolet radiation, and recovering N-3-mercaptopropyl succinimide from the resulting reaction mixture.

References Cited by the Examiner
UNITED STATES PATENTS 2,411,961  12/1946  Evans et al. _____ 204—163
2,411,983  12/1946  Vaughan et al. _____ 204—163

OTHER REFERENCES

Babichev et al., Chemical Abstracts, vol. 51, page 373 (1957).

Onyszchuk et al., Can. J. Chem., vol. 33, pages 1034–42, (1955).

Royals, Advanced Organic Chemistry, pp. 371–2 (Prentice-Hall) (1954).

ALEX MAZEL, *Primary Examiner.*

NICHOLAS S. RIZZO, *Examiner.*

JOSE TOVAR, ROBERT T. BOND, *Assistant Examiner.*